US012613698B2

(12) United States Patent
Witt et al.

(10) Patent No.:  US 12,613,698 B2
(45) Date of Patent:  Apr. 28, 2026

(54) APPARATUS AND METHOD FOR HIDING VECTOR LOAD LATENCY IN A TIME-BASED VECTOR COPROCESSOR

(71) Applicant: Simplex Micro, Inc., Austin, TX (US)

(72) Inventors: David Witt, Bulverde, TX (US); Thang Minh Tran, Austin, TX (US)

(73) Assignee: Simplex Micro, Inc., Tustin, CA (US)

( * ) Notice: Subject to any disclaimer, the term of this patent is extended or adjusted under 35 U.S.C. 154(b) by 0 days.

(21) Appl. No.: 18/609,945

(22) Filed: Mar. 19, 2024

(65) Prior Publication Data

US 2025/0298612 A1     Sep. 25, 2025

(51) Int. Cl.
*G06F 9/30* (2018.01)
*G06F 9/38* (2018.01)
*G06F 15/80* (2006.01)

(52) U.S. Cl.
CPC ...... *G06F 9/30036* (2013.01); *G06F 9/30043* (2013.01); *G06F 9/3016* (2013.01); *G06F 9/3836* (2013.01); *G06F 9/3838* (2013.01); *G06F 9/3861* (2013.01); *G06F 9/3877* (2013.01); *G06F 15/8053* (2013.01)

(58) Field of Classification Search
CPC ............. G06F 9/30036; G06F 9/30043; G06F 9/3016; G06F 9/3836; G06F 9/3838; G06F 9/3861; G06F 9/3877; G06F 15/8053
See application file for complete search history.

(56) References Cited

U.S. PATENT DOCUMENTS

| | | |
|---|---|---|
| 5,021,985 A | 6/1991 | Hu et al. |
| 5,185,868 A | 2/1993 | Tran |
| 5,187,796 A | 2/1993 | Wang et al. |
| 5,251,306 A | 10/1993 | Tran |
| 5,497,467 A | 3/1996 | Wakui et al. |
| 5,655,096 A | 8/1997 | Branigin |
| 5,689,653 A | 11/1997 | Karp et al. |
| 5,699,536 A | 12/1997 | Hopkins et al. |
| 5,799,163 A | 8/1998 | Park et al. |
| 5,802,386 A | 9/1998 | Kahle et al. |
| 5,809,268 A | 9/1998 | Chan |
| 5,835,745 A | 11/1998 | Sager et al. |

(Continued)

FOREIGN PATENT DOCUMENTS

| | | |
|---|---|---|
| EP | 0840213 A2 | 5/1998 |
| EP | 0902360 A2 | 3/1999 |

(Continued)

OTHER PUBLICATIONS

Anonymous: "RISC-V—Wikipedia", Apr. 16, 2022 (Apr. 16, 2022), XP093142703, Retrieved from the Internet: URL:https://en.wikipedia.org/w/index.php?title=RISC-V&oldid=1083030760 [retrieved on Mar. 27, 2024].

(Continued)

*Primary Examiner* — Shawn Doman
(74) *Attorney, Agent, or Firm* — Appleton Luff

(57) ABSTRACT

A processor includes a time counter and a vector coprocessor for executing vector instructions for statically dispatching vector instructions with preset execution times based on a write time of a register in a coprocessor register scoreboard and a time counter provided to a vector execution pipeline. The processor also provides a method for hiding the latency of the vector load instructions.

24 Claims, 9 Drawing Sheets

(56) References Cited

U.S. PATENT DOCUMENTS

| | | |
|---|---|---|
| 5,860,018 A | 1/1999 | Panwar |
| 5,870,579 A | 2/1999 | Tan |
| 5,881,302 A | 3/1999 | Omata |
| 5,903,779 A | 5/1999 | Park |
| 5,903,919 A | 5/1999 | Myers |
| 5,933,618 A | 8/1999 | Tran et al. |
| 5,958,041 A | 9/1999 | Petolino, Jr. et al. |
| 5,961,630 A | 10/1999 | Zaidi et al. |
| 5,964,867 A | 10/1999 | Anderson et al. |
| 5,974,538 A | 10/1999 | Wilmot, II |
| 5,996,061 A | 11/1999 | Lopez-Aguado et al. |
| 5,996,064 A | 11/1999 | Zaidi et al. |
| 6,003,128 A | 12/1999 | Tran |
| 6,016,540 A | 1/2000 | Zaidi et al. |
| 6,035,389 A | 3/2000 | Grochowski et al. |
| 6,035,393 A | 3/2000 | Glew et al. |
| 6,065,105 A | 5/2000 | Zaidi et al. |
| 6,247,113 B1 | 6/2001 | Jaggar |
| 6,282,634 B1 | 8/2001 | Hinds et al. |
| 6,304,955 B1 | 10/2001 | Arora |
| 6,425,090 B1 | 7/2002 | Arimilli et al. |
| 6,453,424 B1 | 9/2002 | Janniello |
| 6,591,359 B1 | 7/2003 | Hass et al. |
| 6,671,799 B1 | 12/2003 | Parthasarathy |
| 6,959,379 B1 | 10/2005 | Wojcieszak et al. |
| 7,069,425 B1 | 6/2006 | Takahashi |
| 7,434,032 B1 | 10/2008 | Coon et al. |
| 8,166,281 B2 | 4/2012 | Gschwind et al. |
| 9,256,428 B2 | 2/2016 | Heil et al. |
| 9,348,590 B1 | 5/2016 | Kashyap et al. |
| 9,354,884 B2 | 5/2016 | Comparan et al. |
| 10,339,095 B2 | 7/2019 | Moudgill et al. |
| 10,346,171 B2 | 7/2019 | Gabor et al. |
| 10,437,595 B1 | 10/2019 | Kanapathipillai et al. |
| 11,062,200 B2 | 7/2021 | Lie et al. |
| 11,132,199 B1 | 9/2021 | Tran |
| 11,144,319 B1 | 10/2021 | Battle et al. |
| 11,163,582 B1 | 11/2021 | Tran |
| 11,188,478 B1 | 11/2021 | Tran |
| 11,204,770 B2 | 12/2021 | Tran |
| 11,263,013 B2 | 3/2022 | Tran |
| 11,467,841 B1 | 10/2022 | Tran |
| 11,829,187 B2 | 11/2023 | Tran |
| 11,829,762 B2 | 11/2023 | Tran |
| 11,829,767 B2 | 11/2023 | Tran |
| 11,954,491 B2 | 4/2024 | Tran |
| 12,061,906 B2 | 8/2024 | Stephens et al. |
| 2001/0004755 A1 | 6/2001 | Levy et al. |
| 2003/0023646 A1 | 1/2003 | Lin et al. |
| 2003/0135712 A1 | 7/2003 | Theis |
| 2004/0073779 A1 | 4/2004 | Hokenek et al. |
| 2004/0168045 A1 | 8/2004 | Morris et al. |
| 2004/0236920 A1 | 11/2004 | Sheaffer |
| 2004/0243894 A1 | 12/2004 | Smith et al. |
| 2005/0038980 A1 | 2/2005 | Rodgers et al. |
| 2005/0251657 A1 | 11/2005 | Boucher |
| 2006/0010305 A1 | 1/2006 | Maeda et al. |
| 2006/0095732 A1 | 5/2006 | Tran et al. |
| 2006/0218124 A1 | 9/2006 | Williamson et al. |
| 2006/0259800 A1 | 11/2006 | Maejima |
| 2006/0288194 A1 | 12/2006 | Lewis et al. |
| 2007/0028078 A1 | 2/2007 | Harris et al. |
| 2007/0038984 A1 | 2/2007 | Gschwind et al. |
| 2007/0113058 A1 | 5/2007 | Tran et al. |
| 2007/0113059 A1 | 5/2007 | Tran |
| 2007/0255903 A1 | 11/2007 | Tsadik et al. |
| 2007/0260856 A1 | 11/2007 | Tran et al. |
| 2008/0114966 A1 | 5/2008 | Begon et al. |
| 2008/0294882 A1 | 11/2008 | Jayapala et al. |
| 2009/0113192 A1 | 4/2009 | Hall et al. |
| 2009/0158279 A1 | 6/2009 | Lino et al. |
| 2009/0217020 A1 | 8/2009 | Yourst |
| 2010/0049958 A1 | 2/2010 | Vaskevich et al. |
| 2010/0064106 A1 | 3/2010 | Yamada et al. |
| 2010/0306505 A1 | 12/2010 | Williamson et al. |
| 2011/0099354 A1 | 4/2011 | Takashima et al. |
| 2011/0153987 A1 | 6/2011 | Luke et al. |
| 2011/0320765 A1 | 12/2011 | Karkhanis et al. |
| 2012/0047352 A1 | 2/2012 | Yamana |
| 2012/0060015 A1 | 3/2012 | Eichenberger et al. |
| 2012/0124344 A1 | 5/2012 | Jarvis |
| 2012/0151156 A1 | 6/2012 | Citron et al. |
| 2013/0151816 A1 | 6/2013 | Indukuru et al. |
| 2013/0297912 A1 | 11/2013 | Tran et al. |
| 2013/0298129 A1 | 11/2013 | Rabinovitch et al. |
| 2013/0346985 A1 | 12/2013 | Nightingale |
| 2014/0059328 A1 | 2/2014 | Gonion |
| 2014/0082626 A1 | 3/2014 | Busaba et al. |
| 2015/0026435 A1 | 1/2015 | Muff et al. |
| 2015/0089141 A1 | 3/2015 | Chen et al. |
| 2015/0100754 A1 | 4/2015 | Reid et al. |
| 2015/0212972 A1 | 7/2015 | Boettcher et al. |
| 2015/0227369 A1 | 8/2015 | Gonion |
| 2015/0331760 A1 | 11/2015 | Dalessandro et al. |
| 2016/0092230 A1 | 3/2016 | Chen et al. |
| 2016/0092238 A1 | 3/2016 | Codrescu et al. |
| 2016/0275043 A1 | 9/2016 | Grochowski et al. |
| 2016/0283240 A1 | 9/2016 | Mishra et al. |
| 2016/0371091 A1 | 12/2016 | Brownscheidle et al. |
| 2017/0177345 A1 | 6/2017 | Ould-Ahmed-Vall et al. |
| 2017/0177354 A1 | 6/2017 | Ould-Ahmed-Vall |
| 2017/0185407 A1 | 6/2017 | Shwartsman |
| 2017/0357513 A1 | 12/2017 | Ayub et al. |
| 2017/0371657 A1 | 12/2017 | Mahurin et al. |
| 2018/0181400 A1 | 6/2018 | Scherbinin et al. |
| 2018/0196678 A1 | 7/2018 | Thompto |
| 2018/0253310 A1 | 9/2018 | Stephens |
| 2018/0321938 A1 | 11/2018 | Boswell et al. |
| 2019/0079764 A1 | 3/2019 | Diamond et al. |
| 2019/0243646 A1 | 8/2019 | Anderson |
| 2019/0303161 A1 | 10/2019 | Nassi et al. |
| 2020/0004534 A1 | 1/2020 | Gurram et al. |
| 2020/0004543 A1 | 1/2020 | Kumar et al. |
| 2020/0065111 A1 | 2/2020 | Bouzguarrou et al. |
| 2020/0089528 A1 | 3/2020 | Gutierrez et al. |
| 2020/0125498 A1 | 4/2020 | Betts et al. |
| 2020/0310796 A1 | 10/2020 | Pfister et al. |
| 2020/0319885 A1 | 10/2020 | Eyole et al. |
| 2020/0371810 A1 | 11/2020 | Lichtenau et al. |
| 2020/0387382 A1 | 12/2020 | Tseng et al. |
| 2021/0026639 A1 | 1/2021 | Tekmen et al. |
| 2021/0200550 A1 | 7/2021 | Sivtsov et al. |
| 2021/0208891 A1 | 7/2021 | Wen et al. |
| 2021/0311743 A1 | 10/2021 | Tran |
| 2021/0326141 A1 | 10/2021 | Tran |
| 2021/0389979 A1 | 12/2021 | Tran |
| 2022/0066760 A1 | 3/2022 | Chang et al. |
| 2022/0326988 A1* | 10/2022 | Gunter .................... G06F 9/321 |
| 2023/0068637 A1 | 3/2023 | Feiste et al. |
| 2023/0130826 A1 | 4/2023 | Segger |
| 2023/0214218 A1 | 7/2023 | Battle et al. |
| 2023/0244490 A1 | 8/2023 | Tran |
| 2023/0244491 A1 | 8/2023 | Tran |
| 2023/0367599 A1 | 11/2023 | Waterman et al. |
| 2023/0393852 A1 | 12/2023 | Tran |

FOREIGN PATENT DOCUMENTS

| | | |
|---|---|---|
| EP | 0959575 A1 | 11/1999 |
| WO | 0010076 A1 | 2/2000 |
| WO | 0208894 A1 | 1/2002 |
| WO | 0213005 A1 | 2/2002 |
| WO | 2024015445 A1 | 1/2024 |

OTHER PUBLICATIONS

Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

(56)     References Cited

OTHER PUBLICATIONS

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

PCT/US2023/018996, Written Opinion of the International Preliminary Examining Authority, Apr. 8, 2024.

PCT/US23/27497: Written Opinion of the International Searching Authority.

PCTUS2023081682, Written Opinion of the International Searching Authority, Mar. 22, 2024.

Written Opinion of The International Preliminary Examining Authority, PCTUS2023/018970, Mar. 25, 2024.

Written Opinion of the International Searching Authority, PCT/S2022/052185.

Written Opinion of the International Searching Authority, PCT/US2023/018970.

Written Opinion of the International Searching Authority, PCT/US2023/018996.

PCT/US2023/018970, International Preliminary Report on Patentability, Jul. 18, 2024.

PCT/US2023/018996, International Preliminary Report on Patentability, Jul. 19, 2024.

H. O. Kultala et al., "Exposed datapath optimizations for loop scheduling," 2017 International Conference on Embedded Computer Systems: Architectures, Modeling, and Simulation (SAMOS), Pythagorion, Greece, pp. 171-178 (Year: 2017).

PCT/US2024/02037, Written Opinion of the International Searching Authority, Dec. 11, 2024.

PCT/US2024/020737 International Search Report, Dec. 11, 2024.

Wang, Y., Jia, Z., Chen, R., Wang, M., Liu, D. and Shao, Z., Loop scheduling with memory access reduction subject to register constraints for DSP applications. Softw. Pract. Exper., pp. 999-1026. (Year: 2014).

* cited by examiner

Write Control 164

| Time | V | Reg |
|------|---|-----|
| 255 | 0 | v0 |
| 254 | 0 | v0 |
| . | 1 | v25 |
| 35 | 1 | v14 |
| 34 | 1 | v22 |
| →33 | 1 | v30 |
| . | 1 | v16 |
| 2 | 0 | v0 |
| 1 | 0 | v0 |
| 0 | 0 | v0 |

167    165

V time count

Read Control 162

| Time | V | Reg |
|------|---|-----|
| 255 | 0 | v0 |
| 254 | 0 | v0 |
| . | 1 | v27 |
| 27 | 1 | v11 |
| 26 | 1 | v7 |
| →25 | 1 | v27 |
| . | 1 | v5 |
| 2 | 0 | v0 |
| 1 | 0 | v0 |
| 0 | 0 | v0 |

163    161

V time count

| | | latency time | V time count | write time | v16 wr_time | v16 rd_time | v1 wr_time | v31 wr_time | v31 rd_time | LS buffer time |
|---|---|---|---|---|---|---|---|---|---|---|
| vle32 | v16, [r20, 4] | 33 | 5 | 38 | 38 | - | - | - | - | 37 |
| vmul | v1, v16, v2 | 3 | 6 | 41 | 38 | 38 | 41 | - | - | - |
| vle32 | v16, [r22, 0] | 33 | 7 | 40 | 40 | 38 | 41 | - | - | 39 |
| vmul | v31, v16, v3 | 3 | 8 | 43 | 40 | 40 | 41 | 43 | - | - |
| vse32 | v31, [r23, 4] | - | 9 | - | 40 | 40 | 41 | 43 | 43 | 43 |
| vle32 | v16, [r11, 8] | 16 | 10 | 25 | 41 | 40 | 41 | 43 | 43 | 40 |
| vmul | v31, v16, v3 | 3 | 11 | 44 | 41 | 41 | 41 | 44 | 43 | - |
| vse32 | v31, [r11, 12] | - | 12 | - | 41 | 41 | 41 | 44 | 44 | 44 |
| | | 241 | 242 | 243 | 244 | 245 | 246 | 247 | 248 | 249 |

FIG. 8

APPARATUS AND METHOD FOR HIDING VECTOR LOAD LATENCY IN A TIME-BASED VECTOR COPROCESSOR

RELATED APPLICATIONS

This application is related to the following U.S. patent applications which are each hereby incorporated by reference in their entirety: U.S. patent application Ser. No. 17/588,315, filed Jan. 30, 2022, and entitled "Microprocessor with Time Counter for Statically Dispatching Instructions;" and U.S. patent application Ser. No. 17/672,622, filed Feb. 15, 2022, and entitled "Register Scoreboard for A Microprocessor with a Time Counter for Statically Dispatching Instructions; and U.S. patent application Ser. No. 17/697,865, filed Mar. 17, 2022, and entitled "Time-Resource Matrix For A Microprocessor With Time Counter For Statically Dispatching Instructions."

TECHNICAL FIELD

The present invention relates to the field of computer processors. More particularly, it relates to issuing and executing vector instructions based on a time count in a processor where the processor consists of a general-purpose microprocessor, a digital-signal processor, a single instruction multiple data processor, a vector processor, a graphics processor, or other type of microprocessor which executes instructions.

TECHNICAL BACKGROUND

A current trend in Artificial Intelligent (AI) and Machine Learning (ML) technologies is to employ a large number of data elements to process the necessary data. A vector processor is a hardware accelerator which can be highly useful in AI and ML applications. A vector instruction is flexible in operating on a large range of 2K bits to 16K bits of vector data when the vector length (VLEN) is configured at, for example, 2K bits. A vector processor requires efficient and high-bandwidth vector load and store operations and a powerful SIMD microarchitecture. The data must be fetched from various memory hierarchies ahead of vector execution and the vector processor microarchitecture must be capable of concurrently executing many vector instructions. The vector operations can be executed out-of-order but must avoid the register renaming technique commonly used for out-of-order execution as such a technique is very expensive for duplicating large vector registers.

Thus, there is a need for a vector processor, and in particular an out-of-order vector processor, which can efficiently handle the complexity of loading and storing of vector data and the parallel execution of vector instructions with a highest possible performance. The needed vector processor must be efficient in handling vector loads with long latency which is a typical case of many applications in artificial intelligence. In a typical application, the memory load and store data operations require large SRAM or DRAM memories with long latency to hold the data sets that are used in arithmetic operations.

SUMMARY

The disclosed embodiments provide a vector register scoreboard for a vector processor with a vector time counter and a method of using the vector register scoreboard for statically dispatching vector load and store instructions to the vector load store unit and other vector instructions to a vector execution pipeline with preset execution times based on a vector time count from the vector time counter. The vector time counter provides a vector time count representing a specified time of the vector processor and is incremented periodically. The vector time count is programmable and is larger than the typical latency time required for an instruction. A vector instruction issue unit is coupled to the vector time counter and receives all vector instructions. The vector instruction issue unit dispatches vector instruction with a preset vector time based on the vector time count to a vector execution unit. The vector execution queue uses the vector time count to dispatch the vector instructions to a vector functional unit when the vector time count reaches the preset execution time.

In one embodiment, a time counter increments every clock cycle and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The add instruction is dispatched to the ALU execution queue with the preset execution times. The read buses, the ALU, and the write bus are scheduled to be busy at the preset times. The vector load instruction is the exception with variable load latencies depending on the memory data type. For example, cacheable data can be kept in a data cache which has a much shorter access time in comparison to noncacheable data. Different latency times can be used for the different memory data types but the latency time can still be varied because of conflicts from multiple accesses. The vector load-store buffer is used in conjunction with the vector time count and ability of stopping the vector time count to accommodate the variable load latency times. The maximum vector time count is designed to accommodate the largest future time to schedule execution of vector instructions. In some embodiments, the vector time count is 256 based on the latency time of a vector load instruction from external memory.

A disclosed approach to microprocessor design employs static scheduling of instructions which is extended to a vector coprocessor. A disclosed static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependencies, (2) availability of read buses to read data from the register file, (3) availability of a functional unit to execute the instruction, and (4) availability of a write bus to write result data back to the register file. The static scheduling issues both baseline and extended instructions as long as the above four conditions are met. In one embodiment, the vector time counter can be frozen if the result data does not return at the expected time.

The four conditions above are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file. The register scoreboard uses the time counter to indicate when a register will be written at a future time and resolving data dependencies for later instructions for condition (1). The time-resource matrices keep track of the available times for (2) a plurality of read buses, (3) a plurality of functional units, and (4) a plurality of write buses to allow the instruction to be issued with a preset execution time.

Since the vector register data width is large, register renaming is expensive in terms of performance. Register renaming is necessary for speculative issue of instructions when the execution pipeline is flushed on branch misprediction. In one embodiment described below, the vector instructions are executed after the vector instructions are committed when there is no possibility of flushing the execution pipeline. The 4 conditions listed above for out-of-order execution of instructions remain the same with vector instructions. Without register renaming, the first condition (1) of "no data dependency" includes write-after-write (WAW) and write-after-read (WAR). The vector register scoreboard includes the read time of a vector register to ensure that the WAR data dependency is properly handled. With static scheduling of instructions based on the vector time count, the instructions are issued and executed, the complexity of dynamic scheduling is eliminated, and the hundreds of comparators for data dependency are eliminated. Instructions are efficiently executed out-of-order with preset times to retain the performance compared to traditional dynamic approaches. The disclosed load-store buffer of the vector coprocessor is designed to hide the load latency of the vector load instructions which could take over 100 cycles to fetch data. The disclosed processor may be referred to as a load latency tolerance processor.

BRIEF DESCRIPTION OF THE DRAWINGS

Aspects of the present invention are best understood from the following description when read with the accompanying figures.

FIG. 8 is a sequence of vector load, store, and arithmetic instructions to illustrate the operation and advantages of embodiments of the present invention.

DETAILED DESCRIPTION

Figure 1:
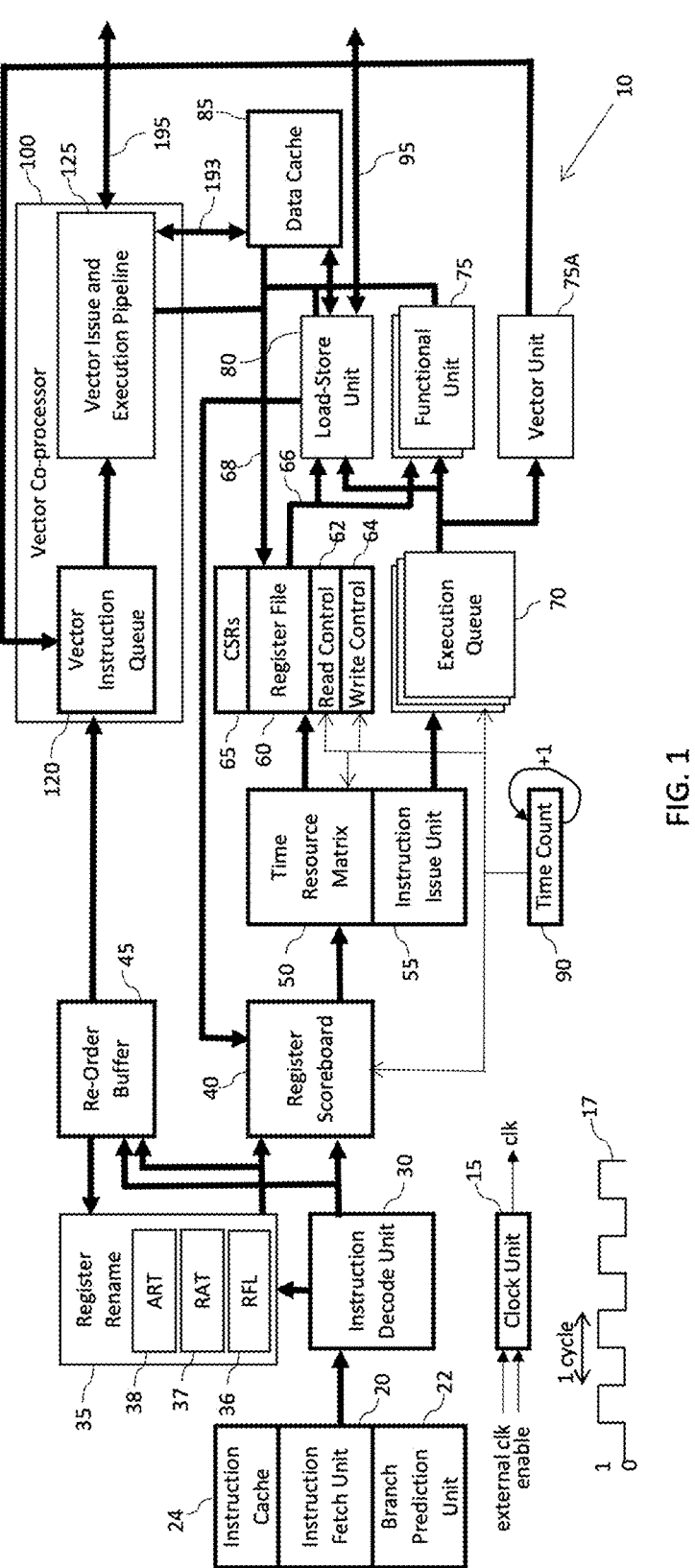
FIG. 1 is a block diagram illustrating a processor based data processing system in accordance with a preferred embodiment of the present invention.

The following description provides different embodiments for implementing aspects of the present invention.

Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment, a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

FIG. 1 is a block diagram of a microprocessor based data processing system. The exemplary system includes a microprocessor 10 having a clock unit 15, an instruction fetch unit 20, a branch prediction unit 22, an instruction cache 24, an instruction decode unit 30, a register renaming unit 35, a register scoreboard 40, re-order buffer 45, a time-resource matrix 50, an instruction issue unit 55, a vector coprocessor 100, a register file 60, control and status registers (CSRs) 65, a read control unit 62, a write control unit 64, a plurality of execution queues 70, a plurality of functional units 75, a load-store unit 80, and a data cache 85. The microprocessor 10 includes a plurality of read buses 66 transporting data from the register file 60 to the functional units 75, the vector unit 75A and load-store unit 80. In an embodiment, the vector unit 75A is designed to read the source operand data and control registers (not shown) and send to vector instruction queue 120 of the vector coprocessor 100. The system also includes a plurality of write buses 68 to write result data from the vector issue and execution pipeline unit 125 of the vector coprocessor 100, the functional units 75, the load-store unit 80, and the data cache 85 to the register file 60. The system also includes a bus 193 to couple and transport data between the data cache 85 and the vector issue and execution pipeline 125 and a bus 195 to couple and transport data between vector coprocessor 100 and external memory (not shown). The load-store unit 80 interfaces with the external memory through bus 95 and the vector data of vector coprocessor 100 interfaces with the external memory thought bus 195. The register file 60 may include both the integer and floating-point registers. The functional units 75 may include both integer and floating-point functional units. The re-order buffer 45 is used to track the order of the instructions as they are decoded in order from the instruction decode unit 30.

The instructions can be executed out-of-order and the re-order buffer 45 retires instructions in-order to update the architectural register table (ART) 38 of the register rename unit 35. The ART 38 may include both integer and floating-point registers. The floating-point instructions reference to the floating-point registers while integer instructions reference to the integer registers. The floating-point instructions may include specific instructions to move registers between the floating-point and integer registers but in general the floating-point and integer instructions reference to their own type of registers. The vector instructions are committed in-order by the re-order buffer 45 where "commit" means the vector instruction is valid and cannot be flushed by branch misprediction. Herein (1) "complete" means that the instruction is executed to generate result data which can be written into a temporary register, an architectural register, or a register file, (2) "commit" means that the instruction cannot be flushed, the instruction can be executed and written back to an architectural register at any time, (3) "retire" means that the result data generated by the instruction is written back to the architectural register or the temporary register is renamed as an architectural register through the ART 38. In the microprocessor 10, the vector instructions are committed by the re-order buffer 45, then the vector instructions are executed and completed possibly out-of-order and retired to the vector register file in the vector coprocessor 100.

Microprocessor 10 is a synchronous microprocessor where the clock unit generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronization of the many different units and states in the microprocessor 10. The clock signal is used to sequence data and instructions through the units that perform the various computations in the microprocessor 10. The clock unit 15 may include an external clock as input to synchronize the microprocessor 10 with external units (not shown). The clock unit 15 may further include an enable signal to disable the clock unit when the microprocessor is in an idle stage or not used for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be execute later in 22 cycles, then the instruction is sent to the execution queue 70 with the execution time count of 27. When the time count increments to 26, the execution queue 70 issues the instruction to the functional unit 75 for execution in the next cycle (time count 27). The load store unit 80 is a functional unit of the execution queue 70. In one embodiment, the vector unit 75A is a functional unit of the execution queue 70. A vector instruction may reference to the register file 60 for source operand data in which case, the vector functional unit 75A must read data from the register file 60 before sending the instruction to the vector instruction queue 120 of the vector coprocessor 100. In another embodiment, the execution queue 70 collects data from control and status registers (CSRs) 65 to be included with the vector instruction and register data to be sent from the vector unit 75A to the vector instruction queue 120. The processor 10 includes a plurality of CSRs 65 for proper execution of all instructions; including floating-point and vector instructions. The CSRs 65 includes configuration registers to indicate the sizes of the data cache and instruction cache, control registers to indicate operations such as programmable rounding mode of floating-point instruction execution, and status registers to indicate operations such as exception and exception type in execution of instructions. The vector CSRs 65 may include programmable vector element width, register grouping and vector length. The time counter unit 90 is coupled to the register scoreboard 40, the time-resource matrix 50, the read control 62, the write control 64, and the plurality of execution queues 70. The same time count is used by the vector coprocessor 100 for issuing and execution of vector instructions in the vector coprocessor 100 as will be discussed below.

The register scoreboard 40 resolves data dependencies in the instructions. The time-resource matrix 50 checks availability of the various resources, which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the vector functional unit 75A or the load-store unit 80 at a preset time. In each case, the preset time is the time determined by the instruction decode unit 30. The preset time is a future time that is based on the time count, so when the time count counts up to the preset time, then the specified action will happen. The specified action can be reading data from the register file, writing data to the register file, issuing an instruction to a functional unit for execution, or some other action. The instruction decode unit 30 determines when an instruction is free of data dependencies and the resource is available. This allows it to set the "preset time" for the instruction to be executed in the execution pipeline. Note that with the exception of register renaming, all discussion related to the register scoreboard, time-resource matrix, and execution queue of the coprocessor 100 also applies to the processor 10.

In the microprocessor system 10, the instruction fetch unit 20 fetches the next instruction(s) from the instruction cache 24 to send to the instruction decode unit 30. The number of instructions per cycle can vary and is dependent on the number of instructions per cycle supported by the processor 10. For higher performance, microprocessor 10 fetches more instructions per clock cycle for the instruction decode unit 30. For low-power and embedded applications, microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled to the branch prediction unit 22 for prediction of the next instruction address when a branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The RISCV instruction set is unique in that it allows instructions to not have precise exceptions on the access on vector loads and stores once their physical addresses have been processed and all branches resolved. Therefore, the vector instruction can be committed relative to the microprocessor 10. This means the actual vector register write/read and computations of vector coprocessor 100 can be deferred relative to the program counter and instruction execution of the microprocessor 10.

This feature allows the microprocessor 10 to be decoupled from the vector coprocessor 100 and allows queuing of the committed vector instructions for later completion relative to the time seen by the microprocessor 10. This additional latency of the deferred computation cycles can be useful to hide the relative latency of the load and load-dependent vector arithmetic instructions by queuing multiple vector load, vector store, and vector arithmetic instruction by using a vector load-store buffer.

The instruction decode unit 30 is coupled to the instruction fetch unit 20 to receive new instructions and also coupled to the register renaming unit 35 and the register scoreboard 40. The instruction decode unit 30 decodes the instructions for instruction type, instruction throughput and latency times, and the register operands. The register operands, for example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The RAW data dependency is often referred to as true dependency and is applied to all types of instructions including vector instructions. The vector instructions may read and write to the register file 60 and are tracked by the register scoreboard 40 as part the main pipeline of the processor 10.

In one embodiment, the register renaming unit 35 consists of a register free list (RFL) 36, a register alias table (RAT) 37, and an architectural register table (ART) 38. The RAT 37 and the ART 38 include the integer registers as defined by the baseline instructions, the custom registers, the floating-point registers for the floating-point instructions, and any extension registers for any extended instructions. Disclosed herein is an implementation of the floating-point instructions as an extension to the baseline instructions for any or combination of different extension instruction types. In one embodiment, the baseline instructions are integer instructions with the 32-entry architectural registers and the floating-point instructions have 32-entry floating-point architectural registers, and 64 temporary registers for renaming, for a total of 128 physical registers, referred to as the register file 60. In one embodiment, the integer and floating-point registers are assumed to have the same data width. If the data width of floating-point registers is smaller than the data width of the integer registers, then the upper bits of the register file 60 are not used when the registers are the floating-point registers. The architectural registers are mapped into the physical register file 60 which the issue and execute pipelines of the microprocessor 10 use to execute instructions based on the registers in register file 60 without any reference to the integer or floating-point registers.

Other data dependencies for the instructions include the write-after-write (WAW) and write-after-read (WAR). The WAW data dependency occurs when 2 instructions write back to the same destination register. The WAW dependency restricts the later instruction from writing back to the same destination register before the earlier instruction is written to it. To address the WAW dependency, every destination register is renamed by the register renaming unit 35 where the later instruction is written to a different register from the earlier register, thus eliminating the WAW data dependency. For example, if three instructions have the same destination register R5, and which are renamed to R37, R68, R74 then the three instructions can write to the destination register at any time. Without renaming, all three instructions will try to write to the same register R5 which is a WAW dependency in that the third instruction cannot write to R5 before the second instruction, which cannot write to R5 before the first instruction. For the vector coprocessor 100, the vector register data width is typically quite large, i.e., 512 bits to several thousand bits, and adding temporary vector registers is very expensive in area, thus in the disclosed embodiment the vector registers are not renamed. For WAW data dependency, the second write to the same destination vector register must not happen before the first write is done.

The register renaming unit 35 also eliminates the WAR data dependency where the later instruction cannot write to a register until the earlier instruction reads the same register. Since the destination register of the later instruction is renamed, the earlier instruction can read the register at any time. In such an embodiment, as the destination registers are renamed, the instructions are executed out-of-order and written back to the renamed destination register out-of-order. The register scoreboard 40 is used to keep track of the completion time of all destination registers. In a preferred embodiment the completion time is maintained in reference to the time count 90. Since register renaming is not used for vector registers, the read time of a vector source register must be tracked in the vector register scoreboard 140 (shown in FIG. 2) so that the second vector instruction cannot write to the same vector register before the first instruction reads the data.

In the above-described embodiment, register scoreboard 40 keeps the write back time for the 128 physical registers. The register scoreboard 40 is associated with the physical register file 60. The RFL 36 keeps track of temporary registers (64 registers in this example) which have not been used. As the destination register of an instruction is renamed, a free-list register is used for renaming. The register alias table 37 stores the latest renamed registers of the architectural registers. For example, if register R5 is renamed to temporary register R52, then the register alias table 37 keeps the renaming of R5 to R52. Thus, any source operand which references to R5 will see R52 instead of R5. As the architectural register R5 is renamed to R52, eventually when register R52 is retired, the architectural register R5 becomes R52 as stored in the ART 38. The RAT 37 keeps track of the architectural register renaming for both integer and floating-point registers which will eventually retire to the ART 38. The register scoreboard 40 indicates the earliest time for availability of a source register of the register file 60, independently of register type.

In one embodiment, if instructions are executed out-of-order, then the re-order buffer 45 is needed to ensure correct program execution. The register renaming unit 35 and the instruction decode unit 30 are coupled to the re-order buffer 45 to provide the order of issued instructions and the latest renaming of all architectural registers. The re-order buffer 45 is needed to commit the instructions in order regardless of when the instructions are executed and written back to the register file 60. The ART 38 is updated only with the instructions before a branch misprediction or instruction exception. In one embodiment, re-order buffer 45 takes the form of a first in first out (FIFO) buffer and committed instructions are invalidated in the re-order buffer 45. Inputs are instructions from the decode unit 30 and instructions are committed and retired in order after completion by the functional unit 75 or the vector functional unit 75A or the load store unit 80. In particular, the re-order buffer 45 flushes all instructions after a branch misprediction or instruction exception. In one embodiment, when the vector unit 75A sends the vector instruction to the vector instruction queue 120, the vector instruction is marked as completed in the re-order buffer 45. When the re-order buffer 45 commits a completed vector instruction, then the vector instruction in the vector instruction queue 120 is marked as ready for execution in the vector coprocessor 100. The committed vector instruction can be scheduled for execution and written back (retired) to the vector register file 160 (shown in FIG. 2) in the vector issue and execution pipeline 125. Another function of the re-order buffer 45 is writing data to memory only in accordance with the order of the load and store execution. The data memory (including data cache 85 and external memory) should be written in order by retiring of the store instructions from the re-order buffer 45. Retiring of store instructions is performed in order.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle to a maximum time count and wrapping around to a zero count. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a tangible, non-transitory computer readable medium, which provides content that represents instructions that can be executed. A computer readable medium may also include a storage or database from which content can be downloaded, A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a tangible, non-transitory computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

Figure 2:
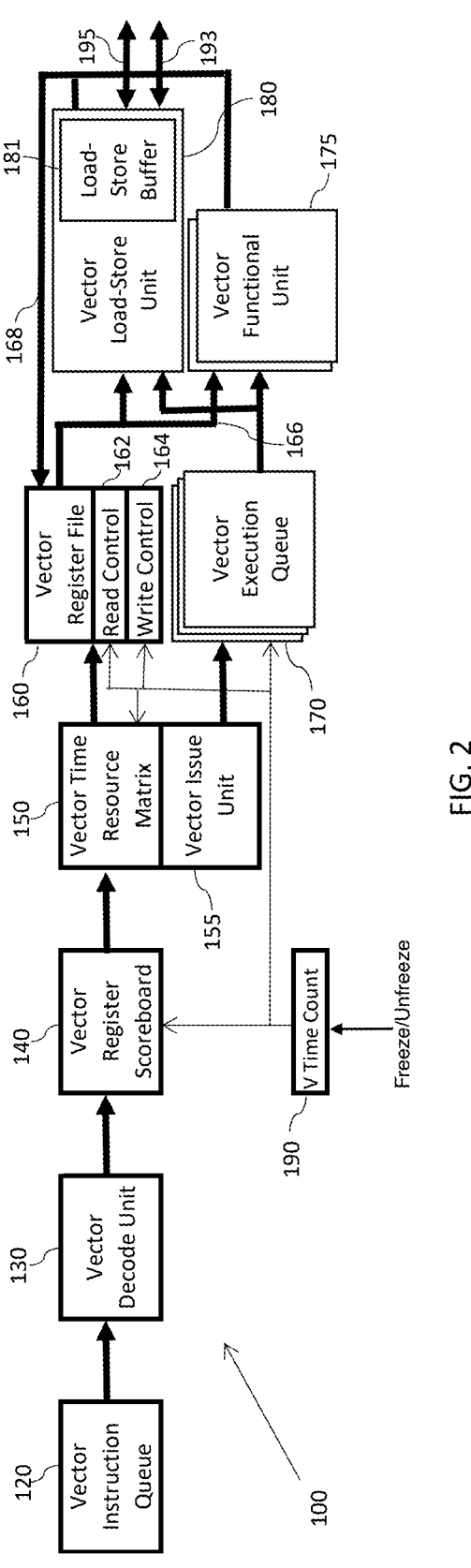
FIG. 2 is a block diagram illustrating an embodiment of the vector co-processor of FIG. 1.

FIG. 2 illustrates a block diagram of a preferred embodiment of vector coprocessor 100. The modules in the vector coprocessor 100 are similar to the modules in the main pipeline of the microprocessor 10 and operate with the same principles. See, e.g., the descriptions in the patent applications referenced above as being incorporated by reference. The modules of the vector coprocessor 100 are numbered corresponding to the modules in the main pipeline of the microprocessor 10 by adding 100 to the reference number. The vector coprocessor 100 includes a vector instruction queue 120, a vector decode unit 130, a vector register scoreboard 140, a vector time-resource matrix 150, a vector issue unit 155, a vector register file 160, a read control unit 162, a write control unit 164, a plurality of vector execution queues 170, a plurality of vector functional units 175, and a vector load-store unit 180. The vector coprocessor 100 includes a plurality of read buses 166 connecting the vector register files 160 to the vector functional units 175 and vector load-store unit 180. The vector coprocessor 100 also includes a plurality of write buses 168 to write result data from the vector functional units 175 and the vector load-store unit 180 to the vector register file 160. The vector load-store unit 180 consists of a vector load-store buffer 181, and multiple buses to the external memory through the bus 195 and the data cache 85 through the bus 193. The vector load-store buffer 181 holds load vector data before being written into vector register file 160, and vector store data from the vector register file 160 before being written to memory which could be data cache 85 or external memory (not shown). The functionality of the modules in the vector coprocessor 100 is similar to those of the main pipeline of the microprocessor 10. Details of the operation of the vector modules correspond to details of the modules of the microprocessor 10. The vector register scoreboard 140 includes the read times of source registers which is necessary for WAR data dependency of vector registers. In one embodiment, the vector coprocessor schedules instructions to be executed at a preset time based on a vector time count from a time counter. In such a vector coprocessor the vector instructions are scheduled to be executed using the known throughput and latency of each vector instruction to be executed. The vector time counter 190 is similar to the microprocessor time counter 90 with the exception that the vector time counter 190 can be frozen when the write time (expected latency time) of the vector load instruction is delayed.

The vector time counter 190 is incremented every clock cycle using the same clock 15 of the microprocessor 10 in FIG. 1.

The vector load and store instructions are a special case because they are in both the main execution pipeline of the processor 10 and the vector coprocessor 100. Instruction decode unit 30 decodes vector load and store instructions in the same manner as with all other instructions. Instruction issue unit 55 schedules for future time counts, the read time of operands, execution time and writing of results. Execution queue 70 dispatches the vector load and store instruction to a functional unit 75 or the vector functional unit 75A or the load-store unit 80 at the preset time determined by the instruction issue unit 55. The addresses of the vector load and store instructions use the registers from the register file 60 while the load and store data are referenced to the vector register file 160. The load/store address calculation is performed in the main pipeline of processor 10 where the address attributes and protection are generated by the load store unit 80. The load-store unit 80 calculates the memory address and validates memory protection for all load and store instructions before accessing data from data cache 85 or sending a request to external memory (not shown) through bus 95. The load store unit 80 accepts speculative instructions, as with all the instructions in the main pipeline, where the load/store instruction can be cancelled and flushed by a branch misprediction or an exception. The load and store instructions in the vector load store unit 180 are executed only after being committed by the re-order buffer 45. The vector load store unit 180 employs a vector load-store queue buffer 181 to track the vector load and store data which can be from data cache 85 through bus 193 or external memory through bus 195. The external memory data can be cacheable or non-cacheable. The term "non-cacheable" refers to data which cannot reside in or cannot be written into the data cache 85. The request to external memory includes an identification number since the data may return out-of-order. Further details of the vector load-store buffer 181 are described in connection with FIG. 7.

Figure 3:
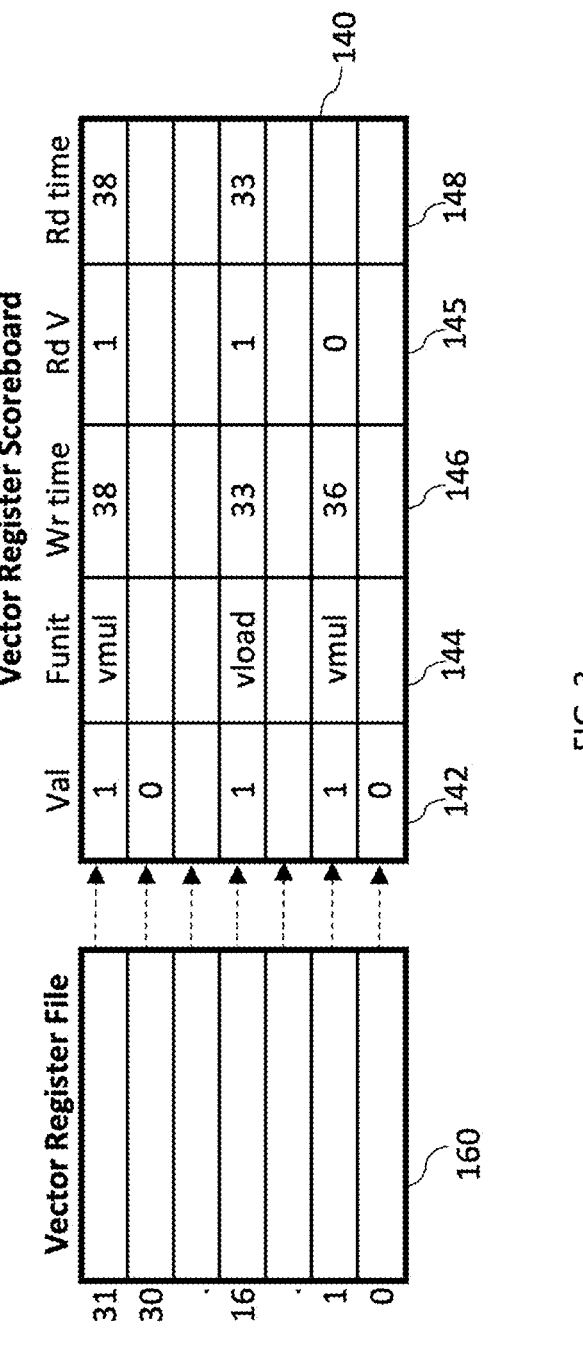
FIG. 3 is a block diagram illustrating an embodiment of a vector register file and a vector register scoreboard.

FIG. 3 illustrates further details of the vector register file 160 and the vector register scoreboard 140. In one embodiment, the vector register file 160 has 32 registers which are architectural vector registers without any renamed registers, numbered as registers 0 to 31 as illustrated. Each register in the vector register file 160 has a corresponding entry in the vector register scoreboard 140. The vector register scoreboard 140 stores the pending read and write statuses for the registers 160. A write valid bit field 142 indicates a valid pending write back to a vector register of the vector register file 160 at a future time in reference to the vector time count, as specified by the write time field 146 from a specific functional unit in the "Funit" field 144. A read valid bit field 145 indicates a valid pending read to a vector register of the vector register file 160 at a future time in reference to the vector time count, as specified by the read time field 148. As examples, illustrated in FIG. 3, registers 1 and 31 are written back at vector time count 36 and 38 from the vector multiply unit (one of the vector functional units 175), respectively. Register 16 is written back at time count 33 from the vector load-store unit 180. The write time 146 is the time in reference to the vector time count. The write time 146 is when the result data is written to the vector register file 160 and can be forwarded from the corresponding functional unit 144 to the subsequent instruction with RAW data dependency. For example, in reference to vector register 16, if the value of the vector time count is 19, then the vector load-store unit 180 produces the result data in 14 clock cycles at time count 33 for writing back to the vector register file 160. In one embodiment, the "Funit" field 144 is 5 bits which accommodate 32 different vector functional units 175 and vector load/store unit 180. The number of bits for "Funit" field 144 is configurable in any given design for addition of a predetermined number of baseline, custom, and extended vector functional units.

In reference to the read time of a register in register file 160, as illustrated in FIG. 3, register 1 is not read by any vector instruction at current time. Register 16 is read at time count 33 and register 31 is read at time count 38. The read time count 148 and the write time count 146 of the registers 16 and 31 are the same indicating that the data are forwarded directly from the functional unit 175 or the vector load-store unit 180 which is identified by the functional unit field 144 instead of reading from the vector register file 160. The read time is the preset time to read data from the vector register file 160. The read data from the vector register file 160 is synchronized with the vector execution queue 170 to send a vector instruction to a vector functional unit 175 or to write to the load-store buffer 181 in the vector load store unit 180.

The write time of a destination register is the read time for the subsequent instruction with RAW data dependency on the same destination register. If the write valid bit 142 of a source register is not set in the register scoreboard 140, then the data in the vector register file 160 can be accessed at any time providing availability of the read buses 166, otherwise the write time 146 is the earliest time to read the source operand data. The write time 146 is when the result data from the vector functional unit 175 or the vector load store unit 180 are on the write bus 168 to the vector register file 160. The result data from write bus 168 can be forwarded to read bus 166 so that the result data is available on the read bus 166 in the same clock cycle in which it is written to the vector register file 160. In one embodiment, the "Funit" field 144 indicates which functional unit will write back to the vector register file 160, and the designated functional unit can restrict the aforementioned forwarding to the read bus 166 due to the presence of a critical timing path. For example, the data from the data cache is a critical timing path in which case forwarding is performed, in one embodiment, to only the vector ALUs. If the issued instruction is vector multiply, then the write time 146 from vector load store unit 180 should be incremented by 1 to be used as the read time for the vector multiply instruction. In such an instance, the vector multiply instruction reads the data from the vector register file 160 one cycle after the vector load data is written to the vector register file 160. Forwarding of data from the data cache 85 to the ALU is normal and is the same as forwarding of any functional unit to any functional unit, while forwarding of data from data cache 85 to a vector multiply unit is not allowed. As an example, when the ALU instruction reads the register 16 of the vector register scoreboard 140 in FIG. 3, the write time 146 of 33 is used as the read time as data can be forwarded from the data cache 85 onto read bus 166. When the multiply instruction reads the same register 16 of the vector register scoreboard 140 in FIG. 3, the read time of 34 is used to read data from the vector register file 160 as the data from data cache 85 are written into the vector register file 160 in cycle 33. This same restriction is kept and does not permit the read control unit 162 to forward the vector load data from the data cache 85 to the vector multiply unit.

Because there is no register renaming in the vector coprocessor 100, the processor must also handle WAW and WAR data dependency. The read time described in the previous paragraph is used to calculate the write time of the vector instruction based on the latency time of the vector instruction. The destination register of the vector instruction is used to access the vector register scoreboard 140 for the valid write time 146 (write valid bit 142 is set) and the valid read time 148 (read valid bit 145 is set) which must be less than the calculated write time of the vector instruction. If either the write time 146 or the read time 148 is greater than the calculated write time, then the read time is adjusted to avoid the WAW and WAR data dependency.

An instruction reads source operand data at read time, executes the instruction with a vector functional unit 175 at execute time, and writes the result data back to the vector register file 160 at write time. The write time is recorded in the write time field 146 of the vector register scoreboard 140. With 2 source registers, a given instruction selects the later write time, of the two source registers, from the vector register scoreboard 140 as the read time for the instruction. The read time is further adjusted by the WAW or WAR data dependency if the write time 146 or the read time 148 of the destination register of the vector instruction is equal or greater than the calculated write time. The execute time is the read time plus 1 where the vector functional unit 175 or the vector load-store unit 180 starts executing the vector instruction. The write time of the vector instruction is the read time plus the vector instruction latency time. If the vector instruction latency time is 1 (e.g., a vector ALU instruction), then the write time and execution time of the vector instruction are the same.

As noted above, each instruction has an execution latency time. For example, the add instruction has a latency time of 1, the multiply instruction has a latency time of 3, and the load instruction has a latency time of 4 assuming a data cache hit. In another example, if the current time count is 5 and the source registers of a vector add instruction receive write time counts from a prior instruction of 22 and 24 from the vector register scoreboard 140, then the read time count is set at 24. In this case, the execution and the write time counts are both 25 for the vector add instruction. As shown in FIG. 2, the vector register scoreboard 140 is coupled to the vector time-resource matrix 150 where the read, execute, and write times of an instruction access the vector time-resource matrix 150 to determine availability of the resources.

Figure 4:
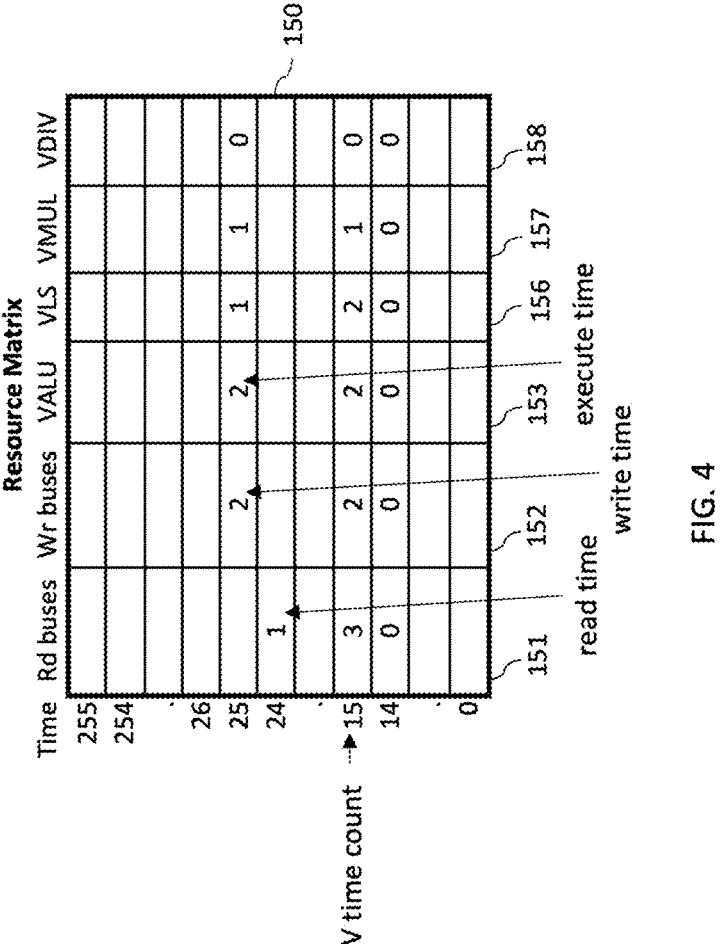
FIG. 4 is a block diagram illustrating an embodiment of a time-resource matrix.

FIG. 4 illustrates further details of the vector time-resource matrix 150 which preferably includes the same number of time entries to match the time counter 190. For example, if the time counter 190 is 64 cycles, then the vector time-resource matrix 150 has 64 entries. In one embodiment, the time counter is incremented every clock cycle and rotates back from the $63^{rd}$ entry to the $0^{th}$ entry. The columns in the vector time-resource matrix 150 represent the available resources for the read buses 151, the write buses 152, the vector ALUs 153, the vector load-store ports 156, the vector multiply unit 157, and the vector divide unit 158. If other custom or vector functional units are provided by vector coprocessor 100 those are also included in the time-resource matrix 150. The time-resource matrix 150 may consist of additional resources (not shown) such as dedicated read buses, write buses, and functional units for replaying of vector instructions.

The read buses column 151 corresponds to the plurality of read buses 166 in FIG. 2. The write buses column 152 corresponds to the plurality of write buses 168 in FIG. 2. The vector ALUs column 153, the vector multiply column 157, and the vector divide column 158 correspond to the plurality of vector functional units 175 of FIG. 2. The load-port ports column 156 corresponds to the load-store unit 180 of FIG. 2.

FIG. 4 also shows an example of the information in the vector time-resource matrix 150. Shown is data with a read time count of 24, an execution time count of 25, and a write time count of 25. When an instruction accesses the vector time-resource matrix 150 for availability of resources, the matrix 150 shows resource availability for each time count, from 0 to 255. In the embodiment of FIG. 4 the present time count is at 15. The matrix 150 shows for example that at read time 24, 1 read bus is busy, at execution time 25, 2 vector ALUs, 1 load-store port, and 1 vector multiply unit are taken for execution of previous vector instructions, and at write time 25, 2 write buses are busy. In one embodiment, the numbers of read buses, write buses, vector ALUs, load/store ports, vector multiply unit, and vector divide unit are 4, 4, 3, 2, 1, and 1, respectively. If a vector add instruction with 2 source registers and 1 destination register is issued with read time of 24, execution time of 25, and write time of 25, then the number of read buses 151 at time 24, write buses 152 at time 25, and vector ALUs 153 at time 25 are incremented to 3, 3, and 3, respectively. The source registers of the add instruction will receive data from read buses 2 and 3, vector ALU 3 is used for execution of the add instruction and write bus 3 is used to write back data from vector ALU 3. The counts in the row are reset by the vector time count. As illustrated in FIG. 4, when the time count is incremented from 14 to 15, all resource counts of row 14 are reset. All resource counts of row 15 are reset when the count is incremented to 16 in next cycle. In the embodiment of FIG. 4 resources are assigned to the issued instruction in-order of the resource count. If an issued instruction is a multiply instruction with execution time of 25, since there is only one multiply unit 157, the issued instruction cannot be issued for execution time of 25. In another embodiment, individual busy bits are used for each resource, i.e., 4 read buses have 4 busy bits, one for each read bus.

All available resources for a required time are read from the vector time-resource matrix 150 and sent to the vector issue unit 155 for a decision of when to issue an instruction to the vector execution queue 170. If the resources are available at the required times, then the instruction can be scheduled and sent to the vector execution queue 170. The issued instruction updates the vector register scoreboard 140 with the write time and updates the vector time-resource matrix 150 to correspondingly reduce the available resource values. All resources must be available at the required time counts for the instruction to be dispatched to the vector execution queue 170. If all resources are not available, then the required time counts are incremented by one, and the time-resource matrix 150 is checked in the next cycle. In another embodiment, two read times (read time and read time +1), two execution times, and two write times are checked per instruction for availability with the expectation that one set of times is free of conflict, increasing the chance for instruction issuing. The earliest available time, in the event that both times are available, is selected for instruction issuance. If all resources are not available at both read times, then the required time counts are incremented by two, and the time-resource matrix 150 is checked in the next cycle. The particular number of read buses 166, write buses 168, and vector functional units 175 in FIG. 2 is preferably chosen to minimize stalling of instructions in the vector issue unit 155. In another embodiment, the counts indicate the number of available resources, and the resource counts are decremented if the resource is assigned to an issued instruction.

Figure 5B:
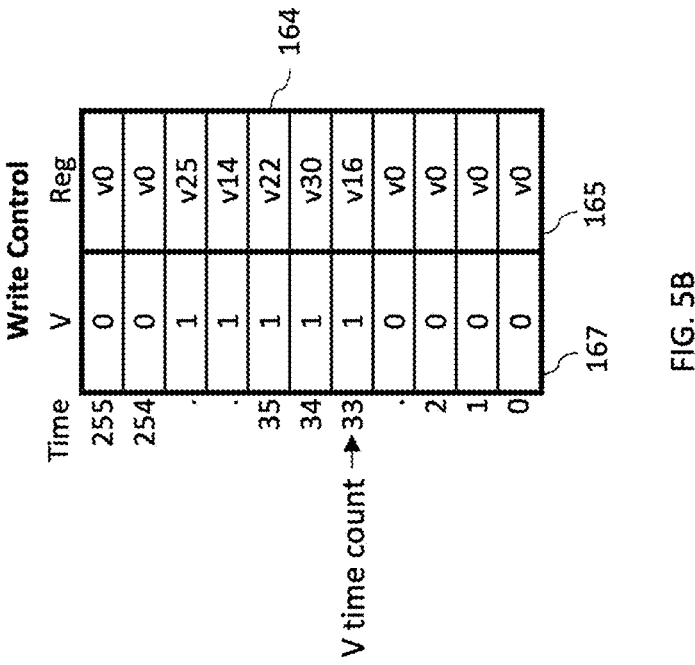
FIG. 5A and FIG. 5B are block diagrams illustrating an example of operation of a read bus control and a write bus control.
Figure 5A:
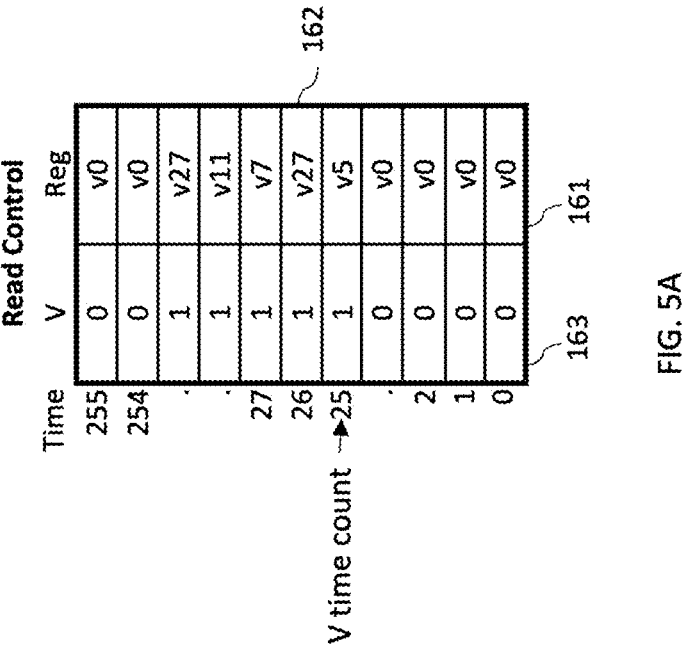

FIG. 5A illustrates control of a single read bus by the read control unit 162 and FIG. 5B illustrates control of a single write bus by the write control unit 164. The read control unit 162 and the write control unit 164 each include a number of time entries to match the vector time counter 190. As mentioned above, in a preferred embodiment the vector time count is incremented every clock cycle, with the exception as described above when the vector time counter 190 is frozen when the write time (expected latency time) of a vector load instruction is delayed. The columns in the read control unit 162 represent the source register 161 and a valid bit 163 for a read bus 166. The columns in the write control unit 164 represent the destination register 65 and a valid bit 67 for a write bus 168.

In the example illustrated in FIG. 5A, at the vector time count of 25 in the read control unit 162 the register v5 from the register field 161 of the read control 162 is used to read an entry 5 from the vector register scoreboard 140 for the "Wr time" 146 and the "Funit" 144. If the write time 146 is the same as the vector time count, then the result data is written back to the vector register file 160 in the same clock cycle. The result data from the "Funit" 144 can be forwarded to the read bus 166 instead of being read from the vector register file 160. In the next cycle, when the vector time count is 26, the register v27 from the register field 161 is used to read from the vector register file 160. The read control unit 162 is responsible for supplying the source operand data on a specific one of the read buses 166. The vector execution queue 170 keeps the information of which one of the read buses 166 is to receive source operand data. The vector execution queue 170 and read control unit 162 are synchronized based on the vector time-resource matrix 150. The read control unit 162 provides centralized control for the read buses 166, thus reducing complexity from the hundreds of instructions in dynamic scheduling architectures. In one embodiment, if the result data do not write back at the preset time 146, then the time counter 190 is frozen until the result data is valid to write back to the vector register file 160. For example, a vector load instruction supposes to write back result data to v16 at time 33 as shown in column 146 of the vector register scoreboard 140 (FIG. 3) and at time 33 of the write control 164 (FIG. 5B). A data cache miss for the vector load instruction in the vector load-store unit 180 causes the vector time counter 190 to freeze the vector time count at time 33. When valid result data is received by the load-store unit 180 from external memory, the load-store unit 180 unfreezes the vector time counter 190 which will allow the write control unit 164 and the register scoreboard 140 to resume writing data from load-store unit 180 to the vector register file 160. Any functional unit which can delay the result data accesses the vector time counter 190 to freeze the vector time count. In one embodiment, only the vector load instruction in the vector load-store unit 180 can freeze the vector time counter 190. In the above example of the read control unit 162 accessing register v5 of the vector register scoreboard 140, the vector time counter 190 may be frozen until valid data are returned for v5.

In FIG. 5A, at the vector time count of 25 in the read control unit 162, the register v5 from the register field 161 of the read control 162 is used to read the entry 5 from the vector register scoreboard 140 for the "Rd time" 148. If the read time 148 is the same as the vector time count, then the read valid bit 145 is reset and the read of the register v5 is performed. If the read time 148 is greater than the vector time count, then the read time 148 is for the later instruction.

Similarly, in FIG. 5B, the register v16 from the register field 165 of the write control unit 164 at the vector time count of 33 is used to write to the vector register file 160. The register v16 will also access the "Funit" 144 of the vector register scoreboard 140 to obtain the result data from a specific vector functional unit 175. Again, the vector execution queues 170, the vector functional units 175, and the write control unit 164 are synchronized to transfer result data on a write bus 168 to write to the vector register file 160. In one embodiment, the valid (valid bit field 167) register 165 of write control unit 164 operates to clear the write valid bit 142 from the vector register scoreboard 140 of FIG. 3 if the write time 146 is the same as the vector time count. The write control unit 164 operates as a centralized control for the write buses 168 which removes complexity compared to distributing such control among the plurality of functional units in dynamic scheduling. In an alternative embodiment with frozen time counter 190, at the time count 33, the result data is written back to the vector register file 160 for the vector register 165 of the write control unit 164. If the result data is delayed. i.e., data cache miss for the load instruction, then the time counter 190 is frozen until the vector load data are valid.

Figure 6A:
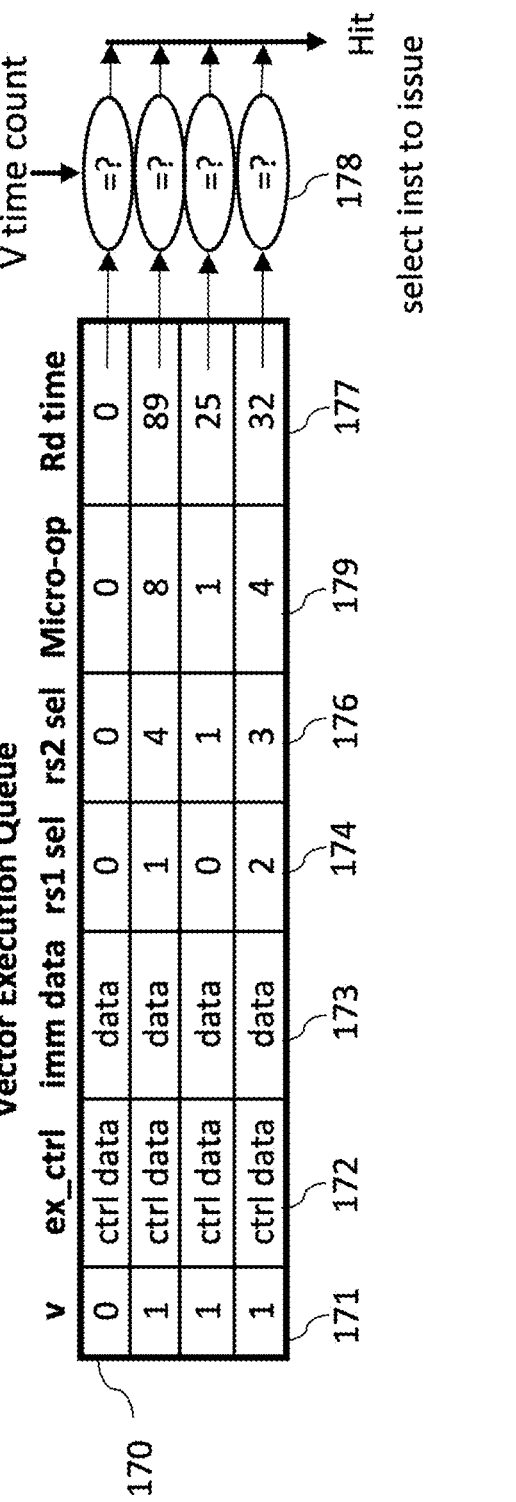
FIG. 6A is a block diagram illustrating an example of operation of a vector execution queue.

FIG. 6A illustrates an example of a 4-entry vector execution queue 170. The number of entries for the vector execution queue 170 is only an illustration. The invention is not limited to any number of vector execution queue 170 entries and the vector execution queue 170 could also take the form of a single-entry execution queue. Each entry represents an instruction waiting for execution by one of the vector functional units 175 or the vector load/store unit 180 according to the vector time count in the read time column 177. Each entry in the vector execution queue 170 preferably consists of the following fields: the valid bit 171, control data 172, the immediate data 173, the first source register select 174, the second source register select 176, the micro-operations 179, and the read time 177. The valid bit 171, when set to "1," indicates that the entry is valid in the vector execution queue 170. The control data 172 specifies the specific operation to be used by the vector functional units 175 or the vector load/store unit 180. The immediate data 173 is an alternative to the second source register for the instruction. In one embodiment, a valid indication for the immediate data 173 may be included in the control data field 172. Most instructions have an option to use immediate data 173 instead of data from the second source register. The first source register select 174 identifies which one of the read buses 166 is providing operand data for the first source register. The second source register select 176 identifies which one of the read buses 166 is providing operand data for the second source register. The source register selects 174 and 176 may not be used for some instructions. In one embodiment, a vector instruction can have up to 8 micro-operations per vector instruction as specified in the micro-operation field 179 in the vector execution queue 170. The read control 162 reads the vector register scoreboard 140 to ensure that the expected source operand data is still valid and is synchronized with the vector execution queue 170 to supply source data to the vector functional unit 175.

Note that the destination register can be, but does not need to be, kept with the instruction. The write control unit 164 is responsible for directing the result data from a vector functional unit 175 to a write bus 168 to write to the vector register file 160. The vector execution queues 170 are only responsible for sending instructions to the vector functional units 175 or the vector load-store unit 180. The read time field 177 which has the read time of the instruction is synchronized with the read control unit 162. When the read time 177 is the same as the vector time count as detected by the comparators 178, the instruction is issued to the vector functional units 175 or the vector load/store unit 180. For the example in FIG. 6A, the entries are issued to the functional units out-of-order. The read time field 177 indicates that the second entry is issued at vector time count 25, the third entry is issued at vector time count 89, and the first entry is issued at vector time count 32.

In an embodiment, each functional unit 175 has its own execution queue 170. In another embodiment, an execution queue 170 dispatches instructions to multiple functional units 175. In this case, another field (not shown) can be added to the execution queue 170 to indicate the functional unit number for dispatching of instructions. In one embodiment, the execution queue 170 is configurable to correspond to a single functional unit, or multiple different functional units, or multiple functional units of the same type such as vector ALU type for multiple vector ALUs or floating-point type for all floating-point vector functional units.

Figure 6B:
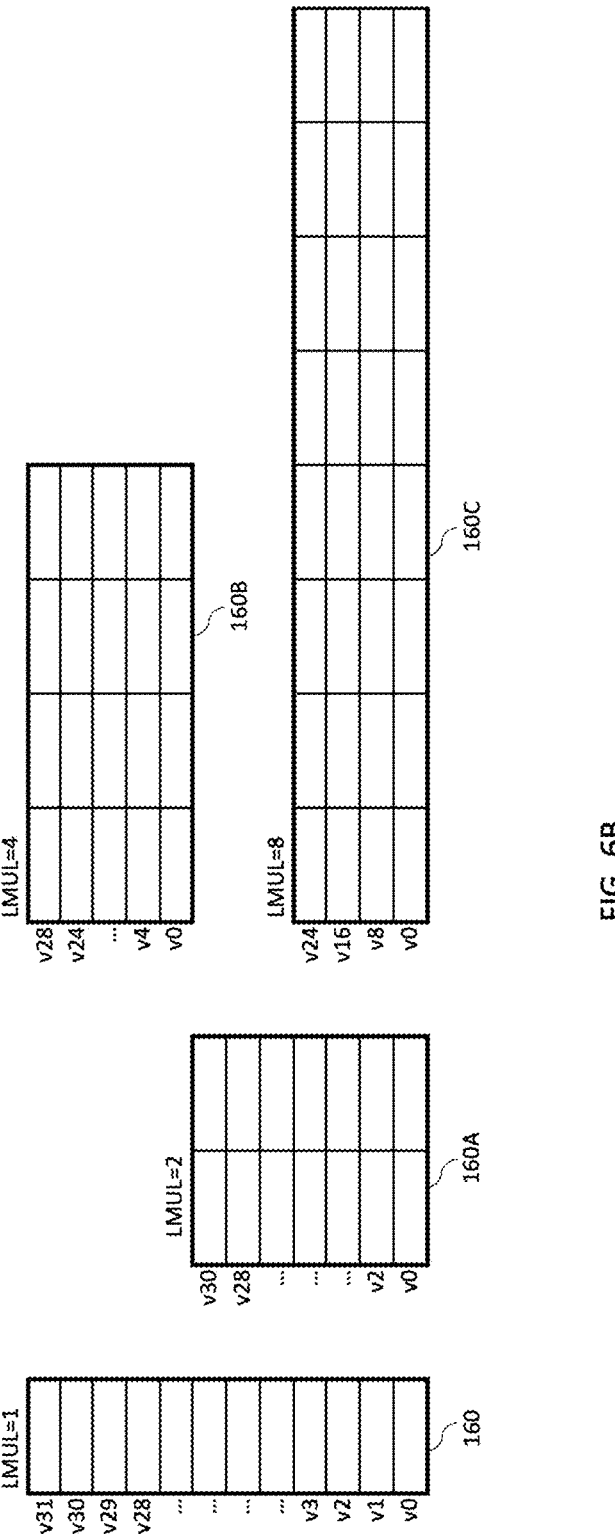
FIG. 6B is a block diagram illustrating register grouping embodiments of the vector register file.

FIG. 6B illustrates an example of vector register grouping of the vector register 160. In one embodiment, the vector registers are grouped by 2, 4, or 8 vector registers and the vector instructions operate on the vector register groups. The vector registers are grouped by 2×, 4×, or 8× as shown by 160A, 160B, and 160C, respectively. The vector register file 160A has half the number of entries with double the vector register width, i.e., the reference to vector register 8 (v8) means v8-v9. The vector register file 160B has one quarter of the number of entries with 4 times the vector register width, i.e., the reference to vector register 8 (v8) means v8-v11. The vector register file 160C has one eighth of the number of entries with 8 times the vector register width, i.e., the reference to vector register 8 (v8) means v8-v15, respectively. For example, with 4× grouping, a vector add instruction adds 4 consecutive source vector registers to 4 consecutive source vector registers and writes back to 4 consecutive destination vector registers. The vector instruction with 4× grouping can be executed in 4 consecutive cycles with 4 micro-operations where each micro-operation is a vector add operation of adding 2 source vector registers and writing the result data to 1 destination vector register. The micro-operation field 179 of the vector execution queue 170 indicates the number of micro-operations which are executed in consecutive cycles by a vector functional unit 175. At the read time 177 of the vector instruction in the execution queue 170, the vector instruction is dispatched to the functional unit 175 in consecutive cycles according to the value in the micro-operation field 179. When the vector instruction with multiple micro-operations is issued from the vector issue unit 155, the resources for the micro-operations must be available from the vector time resource matrix 150 in consecutive cycles. All micro-operations of the vector instruction are issued or stalled in the vector issue unit 155 as a group. The read control unit 162 and the write control unit 164 are synchronized with the vector execution queue 170 for consecutive cycles to provide the source operand data from vector register file 160 and to write back data to the vector register file 160, respectively. The vector register grouping for vector load and store instruction also takes up multiple entries in the vector load-store buffer 181. In another embodiment, each micro-operation of the vector instructions can be issued independently, instead of in con-secutive cycles where each micro-operation has an independent read time and independently accesses the vector time resource matrix 150.

Figure 7:
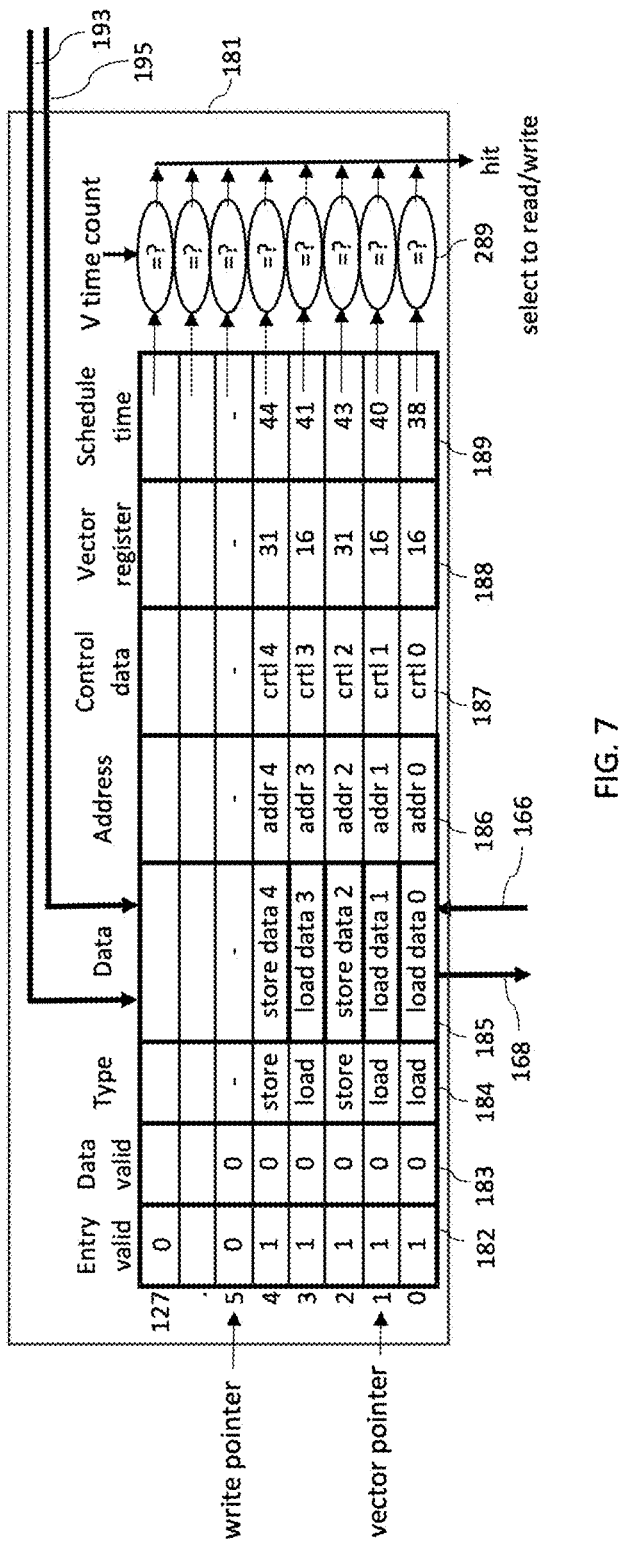
FIG. 7 is a block diagram illustrating an embodiment of the vector load and store buffer of FIG. 2.

FIG. 7 illustrates a block diagram of a vector load-store buffer 181 for handling of vector load and store instructions. The vector load-store buffer 181 has a plurality of entries, preferably more entries than the typical longest memory latency time. For example, if the DRAM memory is the farthest location in the system with typical latency time of 100 cycles, then the load-store buffer 181 should have 128 entries. Each entry in the vector load-store buffer 181 consists of the following bit fields: an entry valid bit 182, a data valid bit 183, a load or store type 184, a vector load/store data 185 which the same width as a vector register, a load/store address 186, load/store control bits 187, a vector register 188 which operates as a destination register for a vector load instruction or a source register for a vector store instruction, and a schedule time 189 which is the expected latency time for the vector load instruction or the read time of the source register for the vector store instruction. The vector load/store data 185 interfaces with the data cache 85 or external memory through bus 193 or bus 195, respectively. The vector load/store data 185 reads from or writes to a vector register of the vector register file 160 through bus 166 or bus 168, respectively. The vector load-store buffer 181 includes comparators 289 to compare the schedule times with the vector time count. The vector load/store data 185 can be implemented as an SRAM array for efficiency where the external memory data is returned with only a single data package per cycle and the writing to the vector register file 160 is limited to 1 per cycle using the same write port for all the vector load to write data back to the vector register file 160 and the time-resource of the write port forces non-conflict time for writing to the vector register file 160. If SRAM array is used, then an extra cycle is added to the schedule time to read from the SRAM array.

The address for the vector load/store instruction is calculated in the load-store unit 80 of the microprocessor 10. For a vector load instruction, if the vector data is in the data cache 85, an entry is allocated in the vector load-store buffer 181 where all the fields are written, i.e. updated, with the exception of the vector register 188 and the schedule time 189. The entries in the vector load-store buffer 181 are allocated in order where the write pointer is incremented to the next entry. The vector load instruction is issued from the vector instruction queue 120 when the vector load instruction is committed by the re-order buffer 45. The vector load instruction is processed by the issue and execution pipeline 125 of the vector coprocessor 100. If the vector load instruction is cancelled by the re-order buffer 45, then the entry valid bit 182 is invalidated, and the vector pointer is incremented to the next entry. The vector pointer is trailing after the write pointer in FIG. 7. The vector register scoreboard 140 and the time-resource matrix 155 determine the write time for the vector load instruction. The preset write time is written into the write control unit 164 and the schedule time 189 of the vector load-store buffer 181; the vector pointer is incremented to the next entry. At schedule time (the vector time count), the comparator 289 indicates a hit which causes a read from the corresponding entry from the vector load-store buffer 181 to write to the vector register file 160 as controlled by the write control unit 164. The entry valid bit 182 for the corresponding entry is changed to zero (entry invalid). The vector load/store data 185 interfaces with the data cache 85 or external memory through bus 193 or bus 195, respectively and is invalidated after the load data is transferred to the vector register file 140. Note that for implementation, in one embodiment, the comparators 289 can compare schedule time to vector time count +1 (or +2, +3 as needed to read or write data) and select the vector load-store buffer 181 entry to be used in the next cycle for timing.

For a vector load instruction, if the vector data is from external memory, then an estimated time is used for the schedule time 189 in the vector load-store buffer 181. Each request to external memory requires a bus request ID since the data can be returned out of order. The entry number in the buffer 181, from 0 to 127, can be used as the bus request ID and the returned data has an attached bus request ID to write data into the corresponding entry in vector data field 185 and to set the data valid bit 183. If the vector load instruction is to load multiple entries for a vector register group, then the first entry number is used as the bus request ID and multiple subsequent entries are written with load data from external memory. The entry valid bit 182, the load/ store type 184, the address field 186, and control data field 187 are also written in the vector load-store buffer 181. Similar to the data cache hit case, the write time for the vector load instruction is calculated with addition of the schedule time 189. The worst-case time for availability of data is written back to the schedule time 189. The data valid bit 183 is set when external data is written into the vector load-store buffer 181 entry. It the data valid bit 183 is set before the schedule time, then vector data is read and written to the vector register file 160 as described in the previous paragraph. At schedule time (the vector time count), if the data valid bit 183 is not set, then the vector time counter 190 is frozen until the data valid bit 183 is set.

The vector store instruction does not cause a delay in read time 148 of the vector register scoreboard 140 to read data from the vector register file 140. The vector load instruction is the only instruction that can be delayed and all other instructions have a fixed latency time. The vector load instruction causes freezing of the vector time counter 190 so that all subsequent instructions will have the correct preset time. A vector load-store buffer 181 entry is allocated when the address for the store instruction is calculated in the load-store unit 80. The vector store instruction can be invalidated or cancelled by the re-order buffer 45 in which case the store entry in the vector load-store buffer 181 can remain valid or be invalidated as with the vector load instruction. The schedule time 189 is when the vector store data from the vector register file 160 is written into the vector data 185 and setting of the data valid bit 183. At this time, the store instruction is scheduled to write to the data cache 85 or to external memory.

The vector load-store buffer 181 in one embodiment is implemented with a circular buffer, in which the write pointer is incremented and wrapped around. The write pointer points to the next entry in the vector load-store buffer 181 for the load-store unit 80 to allocate an entry for the vector load or store instruction. If the entry valid bit 182 for an entry is not set, then that entry at the write pointer can be allocated for the vector load/store instruction. If the entry valid bit 182 is set for each entry, then the vector load-store buffer 181 is full and the load/store instruction must wait and replay in the vector execution queue 170. In some cases, the entry valid bits 182 can be reset out-of-order causing some inefficiency in the vector load-store buffer 181. In another embodiment, the register free list (similar to the RFL 36 of FIG. 1) can be used to allocate and deallocate an entry in the vector load-store buffer 181. The RFL keeps track of all the free entries in the vector load-store buffer which are all free entries at reset. When the vector load or store instruction is processed in the load-store unit 80, a free entry from the RFL is allocated to the vector load or store instruction and as the entry is invalidated, then the entry becomes free and returns to the RFL.

Turning now to FIG. 8, a sequence of vector load, store, and arithmetic instructions illustrates the operation and advantage in accordance to the present invention. The vector load instruction of a 32-bit element is shown in the top row as vle32, v16, [r20, 4], where v16 is a destination register of the vector register file 160, r20 is an integer register of the register file 60, and 4 is the immediate data. The vector load address is calculated from adding r20 and 4. The vector store instruction of a 32-bit element is shown four rows down from the top row as vse32, v31, [r23, 4], where v31 is a source register of the vector register file 160, r23 is an integer register of the register file 60, and 4 is the immediate data. The vector store address is calculated from adding r23 and 4. The vector multiply instruction is shown in the second row from the top as vmul v1, v16, v2, where v1 is the destination register and v16 and v2 are source registers of the vector register file 160. The latency time 241 shows the estimated latency for the three vector load instructions, and the fixed latency for the three vector multiply instructions. The latency time is with respect to the vector register file 160 and the vector register scoreboard 140 and the vector store instruction does not have a latency time. The vector time count 242 is determined by the running vector time counter 190. In this example, the vector instructions are issued 1 per clock cycle. The write time 243 is the best write time of the vector instruction based on the vector register scoreboard 140 and the schedule time 189 of the vector load-store buffer 181. The next 5 columns, 244, 245, 246, 247, and 248 are the write and read times of the vector registers particular to this example. The load-store buffer time 249 is the final schedule time 189 of the vector load or store instruction.

To illustrate the load latency tolerance to the vector coprocessor 100, all the vector load instructions are fetched from external memory. The register scoreboard 140 of FIG. 3 and the vector load-store buffer 181 are used together with the above example. The first vector load instruction has the estimated latency time of 33 and the vector time count of 5 in which the write back time to v16 is 38. The vector register v16 in the scoreboard 140 is 33, so the write time of v16 should be 38 as shown in the first v16 write time 244. The write time 146 for v16 in the scoreboard 140 and the schedule time 189 of entry 0 of the vector load-store buffer 181 are updated to 38. Assuming that v16 of the first multiply instruction is the wort case read time, the read time 148 of v16 of the vector register scoreboard 140 is updated to 38. The latency of the vector multiply instruction is 3 cycles which is added to the read time of 38 to have the write time 146 of v1 to be set at 41 as shown in v1 write time 246. The next vle32 instruction writes to the same v16. With the same latency time of 33 in column 241 and the vector time count of 7 in column 242, the write time of 40 is the later time in comparison to the write time 146 and the read time 148. The new write time of 40 is used to update the write time 146 of vector register v16 and the schedule time 189 of entry 1. The second multiply instruction is similar to the first multiply where the read time 148 of v16 and the write time 146 of v31 are updated to 40 and 43, respectively.

The first vector store instruction reads v31 write time 146 which is 43 as the read time for the vse32 instruction. The read time 43 updates the read time 148 of v31 and the schedule time 189 of entry 2. The third vle32 instruction has the latency time of 16 which is less than the write time 146 of the read time 148 of v16. In this case, the write time of 41 is used to update the write time 146 of vector register v16 and the schedule time 189 of entry 3. Note that the vector data for entry 3 is returned early and stays in the vector load-store buffer 181 until the vector time count is 41 in order to write to v16 of the vector register file 160. In such an instance, in FIG. 7 it can be seen that the schedule time 189 of the entry 3 is 41. The vector data for entry 3 returns early (say at time count of 39) and is written to vector data 185 at time 39. The vector load-store unit 181 does not do anything and waits until the vector time count is 41 which matches with the schedule time 189 in order to write the vector data 185 to the vector register file 160. The next vector multiply instruction reads the write time 146 of v16 from the register scoreboard 140 to set the read time 148 of v16 to 41 and the write time 146 of v31 to 44. The last vse32 instruction reads v31 write time 146 which is 44 as the read time. The read time 44 updates the read time 148 of v31 and the schedule time 189 of entry 4.

If the vector load data return at the exact schedule time 189 then all the vector instructions are scheduled and executed at the preset times which could be hundreds of cycles into the future. If the second vle32 in entry 1 is delayed by 3 clock cycles due to external memory conflicts, then the comparator 289 indicates a hit at time 40 for entry1 without valid data bit 183 being set. The vector time counter 190 is frozen until the load vector data 185 for entry 1 is written and the data valid bit 183 is set. At which time, the vector time counter 190 is unfrozen and the vector time count is still 40 which allows subsequent instructions to be executed at the preset times. In another embodiment, the return load data can bypass the vector load-store buffer 181 and transfer directly on bus 168 to the vector register file 160 which could be 1 fewer cycle to unfreeze the vector time counter 190.

The described operations of FIGS. 2-8 are the same for baseline vector instructions or custom vector instructions of a vector coprocessor 100. The static scheduling of instructions in a microprocessor with a vector time counter 190 simplifies the design of a coprocessor with custom and/or extended instructions. At design time at the RTL level, in some embodiments, the units related to the custom and extended instructions as shown in the block diagram of FIG. 2 can be specified using software scripts. For example, a hardware description language (such as Verilog) that describes the functions performed by the additions of the custom and/or extended instructions of FIG. 2 can be modified by software scripts. The vector execution queues 170 and the vector functional units 175 are designed to be configurable for any custom or extended instructions which can be added to the microprocessor 10 by a software script. The software scripts are part of the software representations can be implemented employing computer-executable instructions, such as those included in program modules and/or code segments, being executed in a computing system on a target real or virtual processor. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A vector coprocessor that processes vector instructions and that is coupled to a processor that executes instructions in accordance with a processor time count representing a current time of the processor, wherein the processor time count is incremented with each clock cycle of a clock unit, the vector instructions including a first committed vector load instruction, received from the processor, the vector coprocessor including hardware that comprises:

a vector time counter generating a vector time count representing a current time of the vector coprocessor, wherein the vector time count is incremented with each clock cycle of the clock unit;

a vector functional unit, among a plurality of vector functional units, that processes vector load data in accordance with the first committed vector load instruction;

a vector load-store buffer coupled to the vector time counter and comprising a plurality of entries wherein an entry is reserved to receive the vector load data and at a schedule time which is a first future time in reference to the vector time count, to write the vector load data to a vector register file; and wherein the vector load-store buffer causes the vector time counter to freeze counting if the vector load data is not received at the schedule time.

2. The vector coprocessor of claim 1 wherein the vector load-store buffer unfreezes counting by the vector time counter upon receiving of the vector load data.

3. The vector coprocessor of claim 1 wherein the vector load-store buffer comprises a circular buffer with a write pointer that is incremented and wrapped around to a first entry, wherein each entry of the vector load-store buffer is identified by an entry number, and wherein the entry number pointed to by the write pointer is employed by the vector load-store buffer as a bus request ID to external memory.

4. The vector coprocessor of claim 1 wherein the vector load-store buffer includes a register free list to assign a free entry to a new vector load instruction or a new vector store instruction and to reclaim the free entry upon deallocation by the vector load-store buffer.

5. The vector coprocessor of claim 4 further comprising:

a vector register scoreboard that contains a first write time of a first vector register in the vector register file, wherein the first write time represents a first future time relative to the vector time count; and vector time-resource matrix circuitry that is coupled to the vector register scoreboard and the vector time counter and that stores information relating to vector resources that are available for at least some vector time counts of the vector time counter, and wherein the vector resources include at least one of: a plurality of vector read buses, a plurality of vector write buses, and a plurality of vector functional units; and vector coprocessor issue circuitry coupled to the vector time-resource matrix circuitry to receive vector data therefrom and to issue a second vector instruction at a particular vector time count if all vector resources indicated by the vector time-resource matrix circuitry are available at the particular vector time count, and to stall the second vector instruction if any of the vector resources indicated by the vector time-resource matrix circuitry are not available at the particular vector time count.

6. The vector coprocessor of claim 4 further comprising:

vector read control circuitry storing, for each of a plurality of vector time count entries, an identification of a vector register in the vector register file that may be read and transported on a vector read bus; and vector write control circuitry storing, for each of a plurality of a vector time count entries, an identification of a vector register in the vector register file that may be written into from a vector write bus.

7. The vector coprocessor of claim 1:

wherein a first vector store instruction is stored in an entry of the vector load-store buffer;

wherein store data specified by the first vector store instruction is read from a vector register file at a preset time in reference to the vector time count; and wherein a store operation specified by the first vector store instruction proceeds when the store data is valid.

8. The vector coprocessor of claim 1 further comprising:

a vector register scoreboard that contains:

a first write time of a first vector register in the vector register file, wherein the first write time represents a first future time relative to the vector time count, a read time of a second vector register in the vector register file, wherein the read time represents a second future time relative to the vector time count; and vector instruction decode circuitry that decodes a first vector load instruction to generate the schedule time, the vector instruction decode circuitry further accessing the vector register scoreboard to obtain read and write times for source operands of a second vector instruction to determine an execution time for the second vector instruction.

9. The vector coprocessor of claim 8 further comprising:

vector write control circuitry that controls access to write buses of the vector coprocessor is synchronized with the schedule time in the vector load-store buffer.

10. The vector coprocessor of claim 1 further comprising:

a vector execution queue that stores a plurality of the vector instructions, and wherein each of the vector instructions has associated therewith a read time which is a corresponding future time relative to the vector time count and wherein the vector execution queue dispatches the vector instructions to at least one vector functional unit.

11. The vector coprocessor of claim 10 wherein the vector execution queue further comprises a micro-operation count that identifies a number of micro-operations of a first vector instruction in consecutive clock cycles of the clock unit.

12. The vector coprocessor of claim 11 further comprising:

vector read control circuitry that forwards data from a vector functional unit or the vector load-store buffer if a write time in a vector register scoreboard is the same as the vector time count.

13. A processor including hardware that comprises:

circuitry to receive and decode a first vector load instruction and dispatch the first vector load instruction to a first functional unit or to a load-store unit;

a re-order buffer that receives decoded instructions in order and records completion of instructions and cancels or validates vector instructions when a branch instruction is mispredicted; and a vector coprocessor comprising:

a vector time counter generating a vector time count representing a current time of the vector coprocessor, wherein the vector time count is incremented periodically;

a vector load-store buffer coupled to the vector time counter and the load-store unit to select a first entry for storage of first vector load data and to store a schedule time corresponding to the vector time count to write the first vector load data to a vector register file;

vector decode circuitry that receives the first vector load instruction upon validation by the re-order buffer and issues the first vector load instruction;

a vector register scoreboard coupled to the vector time counter and the vector decode circuitry to receive the first vector load instruction and to provide a corresponding write time or read time for each operand of the first vector load instruction, wherein the write time corresponds to a future vector time count in which no data dependency is violated;

a vector time-resource matrix coupled to the vector time counter and the vector register scoreboard to receive the write time, and further coupled to the vector load-store buffer to read a first entry, and select a worst case time for updating the schedule time in the vector load-store unit, and further coupled to vector issue circuitry to check the vector time-resource matrix for availability of a write port at the schedule time and to issue the first vector load instruction if the write port is available, or to stall the first vector load instruction in the vector issue circuitry to increment the write time and to access the write port of the vector time-resource matrix again in a next cycle and to update the schedule time in the vector load-store buffer; and wherein the vector issue circuitry is further coupled to the vector register file to write vector data associated with the first vector load instruction if the vector data is valid when the vector time count is the same as the schedule time and if the vector data is not valid to stop counting by the vector time counter until the vector data is valid.

14. A computer program product stored on a non-transitory computer readable storage medium and including computer system instructions for causing a computer system to execute a method that is executable by a vector coprocessor for processing a committed coprocessor vector load instruction received from a processor that operates in accordance with a time count that is incremented with each clock cycle of a clock unit, the method comprising:

generating a vector time count by incrementing a vector time counter with each clock cycle of the clock unit;

receiving a vector load instruction from the processor and allocating an entry in a vector load-store buffer wherein the vector load-store buffer is coupled to the vector time counter and comprises a plurality of entries, each of the entries corresponding to a load instruction or a store instruction;

processing of the committed coprocessor vector load instruction in the vector coprocessor to determine a schedule time in reference to the vector time count of the vector load instruction to write a vector register file when vector load data is valid in the entry of the vector load-store buffer;

freezing the vector time count if the vector load data is not returned at the schedule time; and unfreezing the vector time counter when the vector load data is received and transferred to the vector register file.

15. The computer program product of claim 14 wherein the method further comprises:

incrementing a write pointer in a circular buffer and wrapping the write pointer to a first entry of the circular buffer; and identifying each entry of the vector load-store buffer with an entry number;

employing the write pointer by the vector load-store buffer as a bus request ID to external memory.

16. The computer program product of claim 14 wherein the method further comprises:

assigning with a register free list in the vector load-store buffer a free entry to a new vector load or vector store instruction; and reclaiming the free entry upon deallocation by the vector load-store buffer.

17. The computer program product of claim 16 wherein the method further comprises:

storing to a vector register scoreboard a first write time of a first vector register in the vector register file, wherein the first write time represents a first future time relative to the vector time count; and storing to vector time-resource matrix circuitry, that is coupled to the vector register scoreboard and the vector time counter, information relating to vector resources that are available for at least some vector time counts of the vector time counter, and wherein the vector resources include at least one of: a plurality of vector read buses, a plurality of vector write buses, and a plurality of vector functional units; and receiving with vector coprocessor issue circuitry, that is coupled to the vector time-resource matrix circuitry, vector data therefrom and issuing a second vector instruction at a particular vector time count if all vector resources indicated by the vector time-resource matrix circuitry are available at the particular vector time count, and stalling the second vector instruction if any of the vector resources indicated by the vector time-resource matrix circuitry are not available at the particular vector time count.

18. The computer program product of claim 16 wherein the method further comprises:

storing with vector read control circuitry, for each of a plurality of vector time count entries, an identification of a vector register in the vector register file that may be read and transported on a vector read bus; and storing with vector write control circuitry, for each of a plurality of vector time count entries, an identification of a vector register in the vector register file that may be written into from a vector write bus.

19. The computer program product of claim 14 wherein the method further comprises:

storing a first vector store instruction to a first entry of the vector load-store buffer;

reading store data specified by the first vector store instruction from the vector register file at a preset time in reference to the vector time count; and proceeding with a store operation specified by the first vector store instruction when the store data is valid.

20. The computer program product of claim 14 wherein the method further comprises:

maintaining in a vector register scoreboard, a first write time of a first vector register in the vector register file, wherein the first write time represents a first future time relative to the vector time count, a read time of a second vector register in the vector register file, wherein the read time represents a second future time relative to the vector time count; and decoding in vector instruction decode circuitry a first vector load instruction to generate the schedule time, wherein the vector instruction decode circuitry accesses the vector register scoreboard to obtain read and write times for source operands of a second vector instruction to determine an execution time for the second vector instruction.

21. The computer program product of claim 20 wherein the method further comprises:

controlling access, with vector write control circuitry, to write buses of the vector coprocessor with a synchronized schedule time in the vector load-store buffer.

22. The computer program product of claim 14 wherein the method further comprises:

storing with a vector execution queue a plurality of vector instructions, and wherein each of the vector instructions has associated therewith a read time which is a corresponding future time relative to the vector time count; and dispatching by the vector execution queue the vector instructions to at least one vector functional unit.

23. The computer program product of claim 22 wherein the method further comprises:

maintaining in the vector execution queue a micro-operation count that causes issuance of micro-operations of a first vector instruction in consecutive clock cycles of the clock unit.

24. The computer program product of claim 23 wherein the method further comprises:

forwarding, with vector read control circuitry, data from a vector functional unit or the vector load-store buffer if a write time in a vector register scoreboard is the same as the vector time count.

* * * * *